Figure 1:
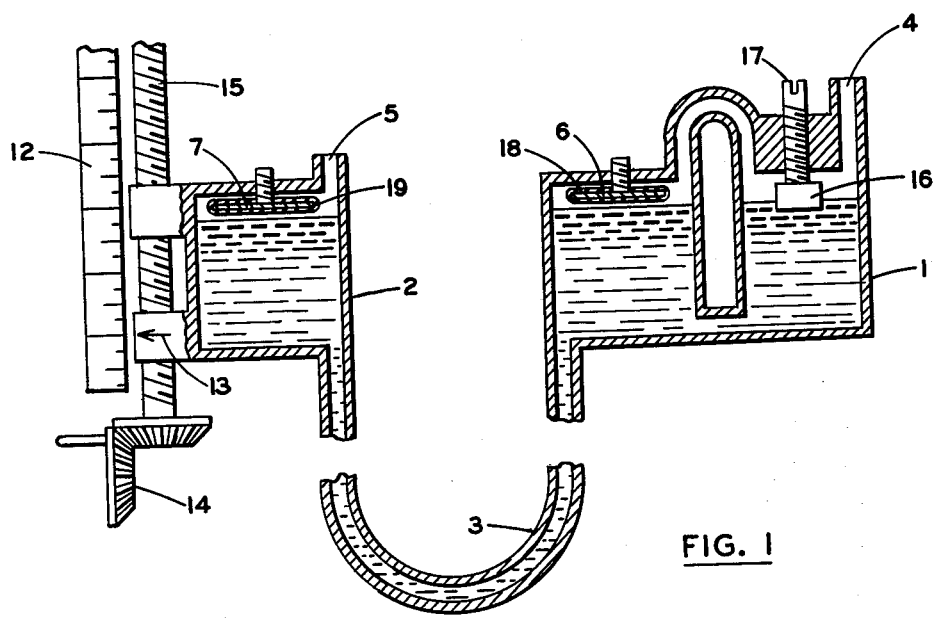

May 26, 1964  J. S. DWORZAN ETAL  3,134,262
PRECISION MANOMETER

Filed Sept. 16, 1963  2 Sheets-Sheet 1

INVENTORS
JOSEPH S. DWORZAN
ROBERT C. CRUZAN
BY Edward P. Redden
THEIR ATTORNEY 3,134,262
PRECISION MANOMETER
Joseph S. Dworzan, 368 Carolet Lane, Orange, Calif., and Robert C. Cruzan, 1801 W. Lorella, La Habra, Calif.
Filed Sept. 16, 1963, Ser. No. 313,140
5 Claims. (Cl. 73—401)

This invention relates to manometers and particularly to a precision manometer for detecting and measuring slight changes in pressures.

This application is a continuation-in-part of application Serial No. 721,993, filed March 17, 1958.

Manometers have long been used for the measurement of low pressures, drafts, and differential pressures. Basically, a manometer measures the difference in height of a liquid in two legs of a U-shaped tube. This measurement is an indication of the difference in pressure at the surfaces of the liquid in the tube. The manometer need not utilize a U-shaped tube but may use any two tanks or containers of the same or different size and shape and which are connected below the surface of the liquid to each other in a manner to allow the liquid to flow freely from one container to the other. The liquid used may be water, mercury, oil or any other suitable liquid. Two different liquids which do not mix together may be used, such as water and oil.

In the past, the difference in height between the two liquid surfaces have been found by measuring the change in height of one of the columns of liquid and multiplying by two. This has resulted in inaccuracies from inaccurate measuring of the levels, from the changes in the density of the liquid, or from changes in the volume of the containers, particularly the flexible tubing connecting the two containers.

A further disadvantage of prior art manometers is their lack of a highly sensitive means for measuring changes in height of the liquid surface.

In accordance with a preferred embodiment of the invention, a precision manometer comprises a pair of tanks interconnected by a flexible conduit. Each tank contains a conductive fluid (preferably mercury) and each tank is so constructed that the retained liquid surfaces have a substantial area. Capacitors having plates of relatively large and constant area separated by a very small air gap comprise one plate formed by each liquid surface and a solid plate supported slightly above the liquid surface so that a change in level of liquid varies the air dielectric gap between the liquid and solid capacitor plates.

Each tank includes an inlet port above the surface of the contained liquid. Differential pressures applied to these ports cause a differential change in height of the liquid contained therein which change results in a differential capacitance change of the liquid-solid plate capacitors. This capacitance change is in turn detected electronically, a phase sensitive bridge circuit, for example, producing an output having a magnitude and phase change proportional to the size and direction of the unbalance.

A precise measurement of the differential pressure is obtained by varying the relative vertical displacement of the two tanks to maintain a null balance at the output of the phase sensitive bridge.

Manometers so constructed provide an extremely accurate measurement of pressure differentials introduced to the two inlet ports. These instruments are self-compensating for changes in liquid volume and for tank level changes and, furthermore, the null balance is independent of any nonlinearities in the electronic portion of the instrument. Moreover, the manometers constructed according to the present invention are very sensitive to changes in differential pressure since the level sensing capacitors produce a very substantial capacitance change for a given change in air gap. Specifically, the capacitance ($\Delta C$) caused by a change in air gap ($\Delta d$) is defined by the following equation:

$$\Delta C = \frac{KA\Delta d}{4\pi(d^2 - \Delta d^2)}$$

where $K$ is the dielectric constant, $A$ is the area of the capacitor plates, and $d$ is the spacing between plates at null. It will thus be seen that the change in capacitance is proportional to the plate area $A$ and approaches a vertical asymptote when the change in air gap $\Delta d$ approaches the null air gap $d$.

Figures 2, 3:
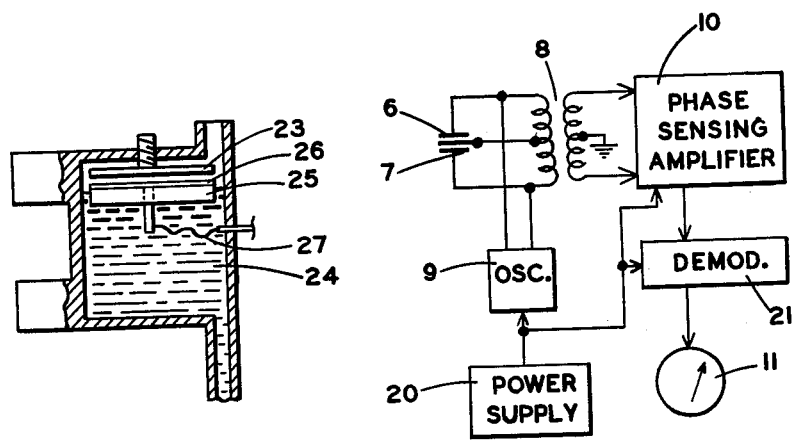
Figure 5:
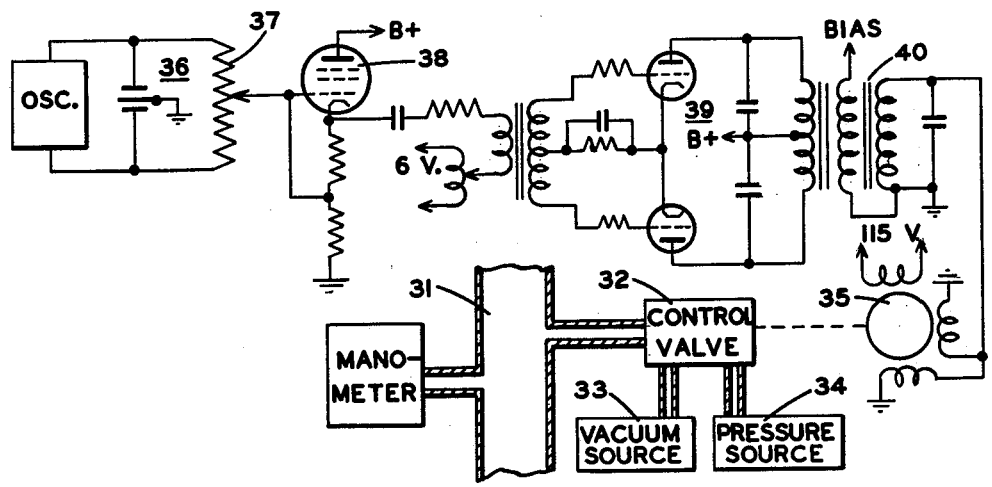
Figure 4:
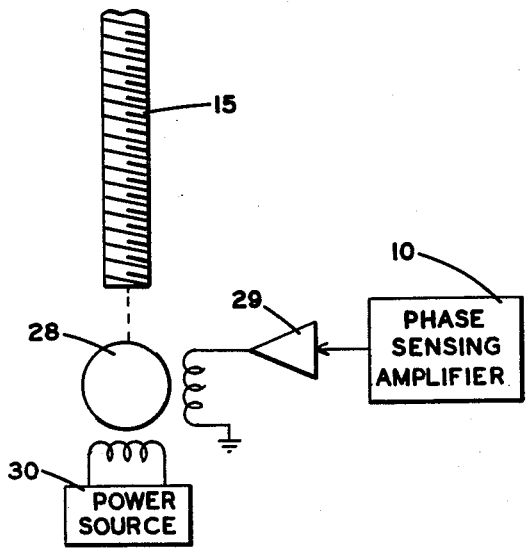

Other and further objects, features and advantages of this invention will become apparent from the following description taken in conjunction with the accompanying drawings in which:

FIG. 1 is a schematic drawing of a preferred embodiment of the precision manometer contemplated by this invention, FIG. 2 is a block diagram of the electronic circuit utilized with the preferred embodiment of the precision manometer of FIG. 1, FIG. 3 is a schematic drawing of an alternate tank utilized in the precision manometer contemplated by this invention, FIG. 4 is a schematic drawing of an alternate means for raising and lowering the movable tank in the precision manometer contemplated by this invention, and FIG. 5 is a detailed schematic drawing of an alternate electronic circuit utilized with the manometer contemplated by this invention.

Referring now to FIG. 1, a preferred embodiment of the precision manometer contemplated by this invention is shown. In this embodiment, stationary tank 1 is connected to movable tank 2 by means of flexible hose 3. Stationary tank 1 has port 4 which is connected to one of the sources of pressure (not shown) to be compared. Movable tank 2 has port 5 which is connected to the other of the sources of pressure (not shown) to be compared. Tanks 1 and 2 and tube 3 are partially filled with a preselected volume of mercury or other electrically conducting liquid. When the pressures entering tanks 1 and 2 through ports 4 and 5 are equal, the liquid levels in tanks 1 and 2 are also equal, as shown in FIG. 1. Positioned slightly above the surface of the liquid in tank 2 is a metal capacitor plate 7. Each of these capacitor plates preferably has a flat porition which is maintained substantially parallel to the surface of the liquid in the tanks. In the preferred embodiment of this invention, capacitor plates 6 and 7 are identical in size and shape and are supported a predetermined equal distance above the surface of the liquid, that is, when the pressures at ports 4 and 5 are equal, the air gap between plate 6 and the liquid in tank 1 is equal to the air gap between plate 7 and the liquid in tank 2. Plates 6 and 7 are preferably coated with thin electrical insulating layers 18 and 19, respectively, to prevent short circuits of the capacitors during surges of pressure changes.

Since the liquid used in this embodiment is mercury, the surface of the liquid in each tank constitutes a capacitor plate. Thus, there are two separate capacitors used in this device, the first consisting of capacitor plate 7 and the liquid in tank 2. The liquid in this case forms a common plate to both of the capacitors Referring now to FIG. 2, a circuit utilized to compare the capacitance of these two capacitors is shown. In this circuit, plates 6 and 7 are connected to the ends of the primary winding of transformer 8 while the liquid mercury is electrically connected to the center tap of the primary winding of transformer 8. Oscillator 9, which derives its power from power supply 20, continuously generates an output signal of substantially uniform frequency and power. This output signal may, for example, be at one kilocycle per second. The output of oscillator 9 is connected across the primary winding of transformer 8. The secondary winding of transformer 8 has a grounded center tap while the end terminals are coupled into phase sensing amplifier 10. The primary winding of transformer and the two capacitors of the manometer thereby form a bridge network. Whenever the capacitance between plate 6 and the mercury is equal to the capacitance between plate 7 and the mercury, the bridge circuit is balanced and the inputs to phase sensing amplifier 10 are equal in phase. This results in zero output of the amplifier. If, however, the two capacitors are unbalanced, phase sensing amplifier 10 detects the resulting phase shift of its inputs and produces an output having a magnitude and phase proportional to the size and direction of the unbalance. This output is fed through demodulator 21 and is indicated on meter 11.

In operation, with equal pressures at ports 4 and 5, movable tank 2 is raised or lowered as the case may be, until the output indicated by meter 11 is zero, indicating a balanced capacitor network. The zero gauge 12 is now aligned with arrow 13 on tank 2. If the pressures in ports 4 and 5 are now unbalanced, for example, by increasing the pressure at port 4, this increase in pressure forces liquid mercury out of tank 1 and into tank 2 through tube 3 until the increased height of the mercury in tank 2 compensates for the change in pressure. As a result, the air gap between plate 6 and the mercury in tank 1 is larger, while the air gap between plate 7 and the mercury in tank 2 is smaller, resulting in an unbalancing of the capacitor network. Meter 11 immediately indicates this unbalance and further indicates the direction and magnitude of the unbalance. Utilizing wheel 14 and screw 15, movable tank 2 is now raised. It is to be noted that the raising of tank 2 does not affect the difference in liquid level between tanks 1 and 2 but merely changes the amount of liquid in each tank. Assuming no change in liquid volume nor in the volume of tanks 1 and 2 and tube 3, meter 11 will again indicate a condition of balance when the liquid level in tank 2 is exactly the same, relative to the tank, as it originally was. Similarly the liquid level in tank 1 is returned to its original level. This occurs as a result of a restoration of the same air gap between plates 6 and 7 and the liquid surfaces of the mercury.

A significant advantage of the present invention is that a very substantial capacitance change is produced in response to an equal and opposite change in liquid level in tanks 1, 2. This capacitance change may be mathematically calculated as follows, where $d$ is the air gap between the plates of both capacitors at null, $K$ is the dielectric constant of the gap, $\Delta d$ is the equal and opposite change in air gap, and $A$ is the area of the capacitor plates. The expression defining the capacitance in each tank is:

$$C = \frac{KA}{4\pi d}$$

for capacitors of equal size in each tank. For equal and opposite changes in the air gap $d$ by a displacement $\Delta d$, the capacitance of one capacitor is then $$C_1 = \frac{KA}{4\pi(d-\Delta d)}$$

and for the other capacitor, $$C_2 = \frac{KA}{4\pi(d+\Delta d)}$$

The change in capacitance, $\Delta C$, equals one-half the difference between $C_1$ and $C_2$ or $$\Delta C = \frac{1}{2}\left[\frac{KA}{4\pi(d-\Delta d)} - \frac{KA}{4\pi(d+\Delta d)}\right]$$

Simplifying this algebraic expression produces the expression $$\Delta C = \frac{KA\Delta d}{4\pi(d^2 - \Delta d^2)}$$

The change in capacitance thus approaches a vertical asymptote as the gap change $\Delta d$ approaches the null gap $d$. In the present invention, this operational state may be readily approximated since the null gap distance $d$ can be preset to a very small value by plunger 16 as described below. The equation for $\Delta C$ also illustrates the advantage of the relatively large, constant area capacitor plates provided by the present invention since the value of the capacitance change is proportional to the plate area $A$.

Another feature of the invention is that very high instrument sensitivity is maintained regardless of how great a pressure differential is developed between ports 4 and 5. Thus, the air gap between the solid plates and the liquid surface plates remains the same at null balance. Since the sensitivity of the detector apparatus is measured and determined by the size of the variable capacitors, which in turn is determined by the size of the air gap between the capacitor plates and the liquid level, the sensitivity of this device does not vary in the slightest with changes in pressure differential.

Provision is however made for changing the sensitivity of this device. Referring now to FIG. 1, plunger 16 is provided in tank 1 in a manner to be raised and lowered external of tank 1 utilizing screw adjustment 17. Assuming an initial balancing of the manometer, the lowering of plunger 16 into the mercury in tank 1 results in a raising by identical increments the liquid levels in tanks 1 and 2. Since plates 6 and 7 are maintained stationary, the air gap between each plate and its liquid surface are reduced by the same increment. Reducing the air gap of a capacitor increases its capacitance. In the circuit shown in FIG. 2 an increase in the capacitance of both capacitors in the input circuit by equal amounts does not unbalance the network or result in a phase shifting of the output. However, increasing the capacitance of the input circuit by equal amounts does result in greater sensitivity of the network to slight unbalancings of the capacitors. Thus, if a liquid level difference of a given magnitude causes a given output while the capacitors have a capacitance of some lower value at null balance, the same liquid level difference will cause a greater output when the capacitors have a capacitance of higher value at null balance. Therefore, lowering plunger 16 into the mercury of tank 1 results in a greater sensitivity of the electronic circuit to changes in liquid level. Similarly, raising plunger 16 in the mercury of tank 1 results in a decreased sensitivity of the electronic circuit.

Plunger 16 is also utilized to compensate for changes in the volume of the liquid in the tanks or changes in the volume of the tanks and tube. For example, a temperature change may cause the mercury to expand or contract and thus assume a different volume, or flexible tube 3 may be bent or pinched resulting in a volume change of the container. Such a change in volume is identical in effect to the aforementioned change in sensitivity and can be compensated for in the same manner by raising or lowering plunger 16.

It is contemplated by this invention that it may not be desirable to utilize mercury or some other electrical conducting liquid as the liquid in the manometer. In an alternative embodiment, a portion of the surface of the liquid is covered with a current carrying substance. This current carrying substance should be permitted to freely rise and fall with changes in the liquid level in tanks 1 and 2. Referring now to FIG. 3, an alternate tank arrangement is shown. In this configuration, the liquid may be water, oil or other non-conducting material. Capacitor plate 23 is substantially identical to plates 6 and 7 of FIG. 1. Floating on the surface of liquid 24, however, is float 25. Float 25 is provided with a substantially flat metallic plate on its upper surface. The float is so designed that the surface of this plate is maintained substantially parallel to the surface of liquid 24. Electrical connection to plate 26 of float 25 is made by flexible wire 27. If both of the tanks are similarly constructed, the circuit of FIG. 2 can be used to indicate the balanced condition of the network. In this case, the wires 27 are connected to the center tap of the primary winding of transformer 8 in place of the mercury.

Referring now to FIG. 4, an alternate method of raising and lowering the movable tank is shown. In this embodiment, screw 15 is driven by reversible two phase motor 28. Motor 28 may, of course, be manually actuated by the operator in response to indications by meter 11. Alternatively, motor 28 may be actuated in response to the output of phase sensing amplifier 10. This output has a phase which is determined by the direction of unbalance of the network. Its magnitude is determined by the magnitude of unbalance of the capacitor network. This output, therefore, after amplification by amplifiers 29, is coupled to one winding of two phase motor 28. The other winding of motor 28 is coupled to source 30 of constant frequency signals having a phase relationship to both possible outputs of amplifier 10 of ninety electrical degrees. The direction in which motor 28 moves movable tank 2 is dependent on the phase of the output of amplifier 10 while the speed of movement is dependent primarily on the magnitude of the output of amplifier 10. This circuit is one method of obtaining a closed loop in the sensing portion of the manometer contemplated by this invention.

In the alternative, it may be desired to utilize the manometer of this invention to control a pressure differential between two pressure sources. In FIG. 5, an electronic circuit utilized to accomplish this result is shown. The manometer of this invention is sensitive to the pressure in tube 31. For example, the manometer continuously compares the pressure in tube 31 to atmospheric pressure. The pressure in tube 31 is controlled by the action of control valve 32 which either reduces the pressure by temporarily connecting tube 31 to vacuum source 33 or increases the pressure by temporarily connecting tube 31 to high pressure source 34. Control valve 32 is adjusted in response to motor 35. The capacitance between plates 6 and 7 and the mercury form part of the normally balanced bridge network 36 which also includes resistor 37. The output of the bridge network is coupled through cathode follower 38 to phase sensing amplifier 39. The phase and magnitude of the output of phase sensing amplifier 39 is determined by the direction and magnitude of the pressure deviation of the gas in tube 31 from atmospheric pressure. This output is coupled through magnetic amplifier 40 to two phase motor 35. Motor 35 actuates control valve 32 in a manner to restore the condition of balance.

Although this invention has been illustrated and described in detail, the same is to be taken by way of illustration and example only and not by way of limitation, the scope of this invention being limited only by the appended claims.

We claim:
1. A precision manometer comprising, in combination, a pair of tanks in fluid communication with each other, a quantity of liquid in said tanks at least the surface portion of which is electrically conductive, an inlet port in each of said tanks located above the surface of the liquid therein, relatively large conductive plates supported in respective ones of said tanks in parallel relation to the surfaces of the liquid therein and at preselected distances therefrom to form respective air gaps, said conductive plates and their adjacent liquid surfaces forming capacitors, a differential pressure applied to the inlet ports of said tanks to produce equal and opposite changes in said air dielectric gaps, and means responsive to differential changes in the capacitance between said capacitors resulting from said air gap changes to provide an indication of the differential pressure applied to said inlet ports.

2. A precision manometer in accordance with claim 1, and including means for moving one of said tanks in a vertical direction relative to the other tank so that a predetermined null balance ratio between said capacitors may be maintained, and means for indicating the magnitude of the relative vertical displacement of said tanks to provide the precise value of the differential pressure applied to said ports.

3. A precision manometer in accordance with claim 1 wherein the air dielectric gaps of both capacitors are equal, and including means to adjust the air dielectric gaps of the capacitors proportionately to change the sensitivity of the means responsive to differential changes in the capacitance between said capacitors.

4. A precision manometer in accordance with claim 1 wherein said responsive means includes null means to detect the magnitude and direction of the difference in capacitance between said capacitors caused by changes in the differential pressure at the inlet ports, means operable in response to the output of said detecting means to reestablish the null condition, and means controlled by said reestablishing means to indicate the difference in pressure between said inlet ports.

5. A precision, very high sensitivity manometer comprising, in combination,
first and second tanks having relatively large cross-section areas to retain first and second bodies of liquid so that the liquid surface areas are substantial;
an electrically conductive liquid forming said first and second bodies of liquid;
a flexible tube connected between the lower parts of said first and second tanks to permit said liquid to flow freely between said first and second tanks;
inlet ports in said first and second tanks at locations above the normal levels of said first and second bodies of liquid;
a first relatively large metal plate having a thin electrically insulated coating thereover supported in said first tank in parallel relation to the surface of said first body of liquid with a small air gap therebetween,
said first metal plate and the surface of said first body of liquid forming a first parallel plate capacitor of constant area and very small air gap;
a second relatively large metal plate having a thin electrically insulated coating thereover supported in said second tank in parallel relation to the surface of said second body of liquid with a small air gap therebetween;
said second metal plate and the surface of said second body of liquid forming a second parallel plate capacitor of constant area and very small air gap;
means to individually adjust the air gaps of said first and second capacitors to provide a preselected ratio of the capacitance of said first and second capacitors;
a plunger movable into and out of one of said first and second bodies of liquid to vary the sensitivity of the manometer without changing said preselected ratio;

means to detect the magnitude and direction of a change in said preselected ratio which occurs as a result of a change in said differential pressure;

means operable to move one of said first and second tanks relative to the other in a substantially vertical direction to reestablish said preselected ratio; and, scale means controlled by the relative movement of said first and second tanks to provide a reading systematically related to the difference in pressure at said first and second inlet ports.

References Cited in the file of this patent

UNITED STATES PATENTS

| 2,703,876 | Edmundson et al. | Mar. 8, 1955 |
| 2,704,342 | Fielden | Mar. 15, 1955 |

FOREIGN PATENTS

| 435,547 | Germany | Oct. 13, 1926 |
| 646,910 | Germany | June 23, 1937 |